United States Patent
Amtmann

(12) 
(10) Patent No.: US 6,442,215 B1
(45) Date of Patent: Aug. 27, 2002

(54) DATA CARRIER WITH AT LEAST TWO DEMODULATION STAGES HAVING DIFFERENT SENSITIVITIES FOR MODULATED CARRIER SIGNALS WITH DIFFERENT MODULATION INTENSITIES

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/352,316

(22) Filed: Jul. 12, 1999

(30) Foreign Application Priority Data

Jul. 13, 1998 (EP) .............................................. 98890203

(51) Int. Cl.$^7$ .............................................. H04L 27/06
(52) U.S. Cl. .................................................... 375/316
(58) Field of Search ................................ 375/316, 147, 375/130, 286; 455/101, 104, 500

(56) References Cited

U.S. PATENT DOCUMENTS

| | | | | |
|---|---|---|---|---|
| 5,347,542 A | * | 9/1994 | Kurby et al. | 375/286 |
| 5,526,061 A | * | 6/1996 | Brilka et al. | 348/537 |
| 5,577,087 A | * | 11/1996 | Furuya | 370/337 |

* cited by examiner

Primary Examiner—Chi Pham
Assistant Examiner—Khai Tran
(74) Attorney, Agent, or Firm—Harold Tsiang

(57) ABSTRACT

A data carrier receives at least two carrier signals which are modulated in respect of the same signal parameter but with different modulation intensities. The data carrier has at least two demodulation stages, each of which having a sensitivity adapted to a modulation intensity used for a modulated carrier signal. The data carrier further has priority means capable of granting priority each time to one demodulation stage in such a manner that a demodulated carrier signal reaches signal processing means only from that modulation stage.

10 Claims, 2 Drawing Sheets

DATA CARRIER WITH AT LEAST TWO DEMODULATION STAGES HAVING DIFFERENT SENSITIVITIES FOR MODULATED CARRIER SIGNALS WITH DIFFERENT MODULATION INTENSITIES

BACKGROUND OF THE INVENTION

1. Field of the Invention

The invention relates to a data carrier which includes receiver means for receiving a carrier signal modulated in respect of a signal parameter and with a given modulation intensity, and includes an integrated circuit which includes connection means which are connected to the receiver means, a demodulation stage which is connected to the connection means, is arranged to demodulate the modulated carrier signal and to output a demodulated carrier signal, and has a sensitivity adapted to the given modulation intensity used for the modulated carrier signal, and includes signal processing means which succeed the demodulation stage and are arranged to process the demodulated carrier signal.

The invention also relates to an integrated circuit for a data carrier, which circuit includes connection means for receiving a carrier signal modulated in respect of a signal parameter and with a given modulation intensity, includes a demodulation stage which is connected to the connection means, is arranged to demodulate the modulated carrier signal and to output a demodulated carrier signal, and has a sensitivity adapted to the given modulation intensity used for the modulated carrier signal, and includes signal processing means which succeed the demodulation stage and are arranged to process the demodulated carrier signal.

2. Description of the Related Art

A data carrier of the kind set forth in the first paragraph and an integrated circuit of the kind set forth in the second paragraph are known from commercially available data carrier systems which are often also referred to as transponder systems. In order to transmit data from a write/read station to a data carrier (transponder) in such a data carrier system, a carrier signal is modulated in the write/read station, that is to say in dependence on the data to be transmitted. Such a known data carrier system utilizes modulation in the form of amplitude modulation, so that the write/read station transmits an amplitude modulated carrier signal to a data carrier; this amplitude modulated carrier signal is demodulated by means of a demodulation stage which is included in the known data carrier, i.e. an amplitude demodulation stage, so that subsequent to the demodulation there is obtained a demodulated carrier signal wherefrom the data transmitted to the known data carrier can be derived.

In the known data carrier system, or in the known data carrier, a carrier signal is subjected to an ampitude modulation where the modulation intensity, i.e. the so-called modulation percentage, amounts to essentially 100%. The advantage of such amplitude modulation resides essentially in the fact that the amplitude modulation means required for this purpose can be constructed simply as an integrated circuit. How ever, such an amplitude modulation with a modulation intensity or modulation percentage of 100% has a drawback in that, when this amplitude modulation is used, the side band signals then occurring during the transmission have a comparatively high level; this often gives rise to problems in complying with country specific rules and regulations in respect of interference effects.

SUMMARY OF THE INVENTION

It is an object of the invention to avoid the described problems in a data carrier of the kind set forth in the first paragraph and in an integrated circuit of the kind set forth in the second paragraph, and to realize an improved data carrier and an improved integrated circuit in a simple way and while using only few means.

In order to achieve this object for a data carrier of the kind set forth in the first paragraph according to the invention the data carrier is arranged to receive at least one additional carrier signal which is modulated in respect of the same signal parameter but with an other, given modulation intensity, the circuit including at least one additional demodulation stage which is also connected to the connection means and has an other sensitivity which is adapted to the other, given modulation intensity used for the additional modulated carrier signal, there being provided priority means which ensure that priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the demodulation stage having the each time lowest sensitivity, and that a demodulated carrier signal reaches the signal processing means only from this one demodulation stage.

In order to achieve the above object for an integrated circuit of the kind set forth in the second paragraph according to the invention the data carrier is arranged to receive at least one additional carrier signal which is modulated in respect of the same signal parameter but with an other, given modulation intensity, the circuit including at least one additional demodulation stage which is also connected to the connection means and has an other sensitivity which is adapted to the other, given modulation intensity used for the additional modulated carrier signal, there being provided priority means which ensure that priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the modulation stage having the each time lowest sensitivity, and that a demodulated carrier signal reaches the signal processing means only from this one demodulation stage.

As a result of the steps proposed according to the invention, using means which can be comparatively simply implemented, a data carrier according to the invention, or a circuit according to the invention, can receive and demodulate modulated carrier signals having different modulation intensities without special facilities being required; the priority means simply and effectively ensure that priority is always granted to the demodulation stage which offers the qualitatively best demodulated carrier signal with each time the highest signal-to-noise ratio so that only this stage outputs a demodulated carrier signal to the appropriate signal processing means.

It has been found that it is advantageous to take the steps proposed in the claims 2 and 7, because they enable a very reliable and interference-independent implementation.

The steps proposed in the claims 3 and 8 are advantageous because the demodulation stages are then used additionally for suppressing the forwarding of demodulated carrier signals to the subsequent signal processing means.

However, the steps disclosed in the claims 4 and 9 have also been found to be advantageous, because customary demodulation stages may then be used.

The steps disclosed in the claims 5 and 10 have also been found to be very advantageous, because they ensure that interference signals which occur at the outputs of the demodulation stages which have not been granted priority cannot have a disturbing effect on the desired forwarding of the demodulated carrier signal output by the demodulation stage having been granted priority.

The above and further aspects of the invention will become apparent from the embodiments described hereinafter and will be elucidated on the basis of these embodiments.

The invention will be described in detail hereinafter with reference to two embodiments which are shown in the drawings, however, without the invention being restricted thereto.

DETAILED DESCRIPTION OF THE INVENTION

Figure 1:
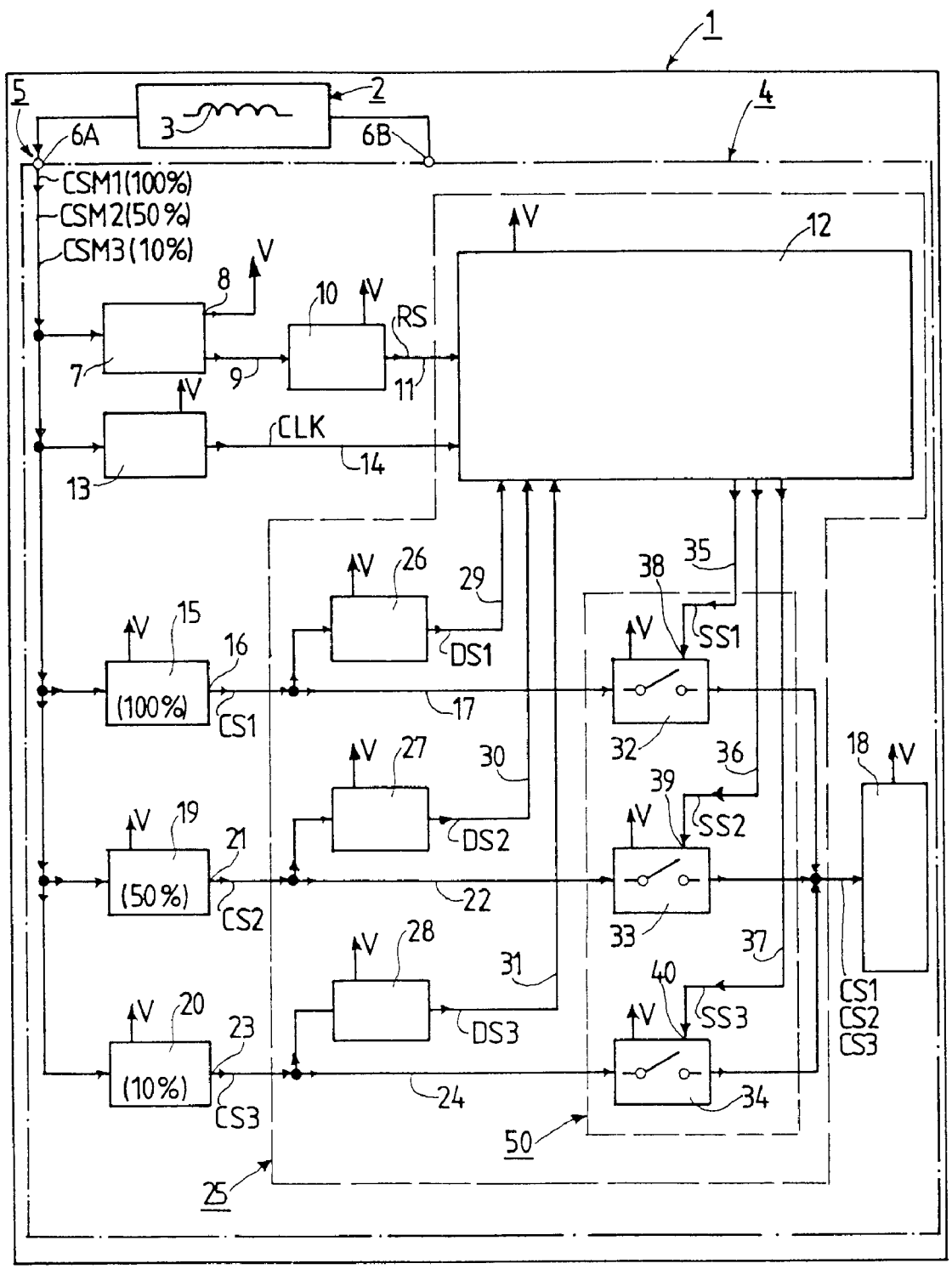
FIG. 1 shows a block diagram of an in this context essential part of a data carrier and a circuit for such a data carrier in a first embodiment according to the invention.

FIG. 1 shows a first embodiment of a data carrier 1 according to the invention. The data carrier 1 includes receiver means 2 which are arranged to receive a first carrier signal CSM1 modulated in respect of a signal parameter and with a given modulation intensity. In the present case the first modulated carrier signal CSM1 is a carrier signal which is modulated in respect of its amplitude with a modulation intensity of 100%. The modulation intensity is often also referred to as the so-called modulation percentage. The receiver means 2 include a transmitter coil 3 as has since long been known.

The data carrier 1 includes an integrated circuit 4 which includes connection means 5 whereto the receiver means 2 are connected. The connection means 5 include two connection contacts 6A and 6B.

The circuit 4 includes voltage generating means 7 which are connected to the first connection 6A and can be supplied with the modulated carrier signal CSM each time received by the receiver means 2. The voltage generating means 7 are capable of generating, using the modulated carrier signal CSM each time supplied, a supply voltage V which is output by the voltage generating means 7 via an output 8. The generated supply voltage V can feed all circuit elements of the data carrier 1, or the circuit 4, requiring the supply voltage V as indicated in FIG. 1. Reset signal generating means 10 are connected to the voltage generating means 7, via a connection 9; these reset signal generating means can generate, upon occurrence of a supply DC voltage V (being the case whenever the data carrier 1 enters the communication range of a write/read station), a reset signal RS whereby a so-called "power-on-reset" can be initiated. The reset signal RS can be applied, via a connection 11, to control means 12 of the data carrier 1 or the circuit 4. In the present case the control means 12 are formed by a simple logic circuit, but may alternatively be formed by a microcomputer.

The circuit 4 also includes clock signal regenerating means 13 which are also connected to the first connection 6A. The clock signal regenerating means 13 can regenerate a clock signal CLK from a respective received modulated carrier signal CSM, so that the clock signal CLK is available in th[0085] circuit 4 as well as in a write/read station transmitting the modulated carrier signal CSM. The regenerated clock signal CLK can be applied to the control means 12 via a connection 14.

The circuit 4 also includes a first demodulation stage 15 which is formed by an amplitude demodulation stage in the present case. The first demodulation stage 15 is arranged to demodulate, i.e. to amplitude demodulate, the first carrier signal CSM1 modulated with a modulation intensity of 100%. Therefore; the first demodulation stage 15 has a sensitivity which is adapted to the 100% modulation intensity of the first modulated carrier signal CSM1. The demodulation stage 15 is arranged to output a first demodulated carrier signal CS1. The first demodulated carrier signal CS1 is output, via an output 16 of the demodulation stage 15, to a first connection 17.

The circuit 4 also includes signal processing means 18 which succeed the first demodulation stage 15 and are arranged to process the first demodulated carrier signal CS1. The signal processing means 18 include decoding means, signal shaping means, test means and the like; however, these means will not be elaborated upon herein, because they are not relevant in the present context.

The clock signal regenerating means 13 in the data carrier 1 shown in FIG. 1 are only arranged to regenerate the clock signal 13. The clock signal regenerating means 13, however, can advantageously be used at the same time for the demodulation of the first carrier signal CSM1 modulated with a modulation intensity of 100%, because the clock signal CLK is completely absent during the 100% modulated signal segments of this modulated carrier signal, so that merely the signal occurring at the output of the clock signal regenerating means 13, i.e. the signal occurring on the connection 14, need be used so as to be applied to a detection stage which detects the absence and the presence of the clock signal CLK, said detection stage outputting a signal which corresponds to the demodulated carrier signal CS1. Such a detection stage may be formed, for example by a very simple RC member. This means that for the demodulation of the first carrier signal CSM1, modulated with a modulation intensity of 100%, instead of the first demodulation stage 15 the already present clock signal regenerating means 13 can be used and additionally only the extremely simple detection stage; this constitutes a very simple and inexpensive implementation.

The data carrier 1 of FIG. 1 is preferably arranged to receive at least one additional modulated carrier signal, being two additional modulated carrier signals CSM2 and CSM3 in the present case. The two additional modulated carrier signals CSM2 and CSM3 are modulated in respect of the same signal parameter of the carrier signal, so in respect of the amplitude of the carrier signal, but with a different modulation intensity. The second modulated carrier signal CSM2 is modulated in respect of its amplitude with a modulation intensity of 50%. The third modulated carrier signal CSM3 is modulated in respect of its amplitude with a modulation intensity of 10%.

For the demodulation of the two additional modulated carrier signals CSM2 and CSM3 the circuit 4 of the data carrier 1 is provided with two additional demodulation stages 19 and 20 which are connected, like the first demodulation stage 15, to the connection means 5, i.e. to the first connection 6A of the connection means 5. Each of the two additional demodulation stages 19 and 20 has a different sensitivity which is adapted to the two additional modulated carrier signals CSM2 and CSM3. The second demodulation stage 19 has a sensitivity which is adapted to the modulation intensity of 50% of the second additional modulated carrier signal CSM2. This means that the sensitivity of the second demodulation stage 19 is higher than the sensitivity of the first demodulation stage 15. The third demodulation stage 20 has a sensitivity which is adapted to the modulation intensity of 10% of the third additional modulated carrier signal CSM3. This means that the sensitivity of the third demodulation stage 20 is higher than the sensitivity of the second demodulation stage 19 and hence also higher than the sensitivity of the first demodulation stage 15. In other words, among the three demodulation stages 15, 19 and 20 the first demodulation stage 15 has the lowest sensitivity, the third demodulation stage 20 has the highest sensitivity and the second demodulation stage 19 has an intermediate sensitivity which lies between the sensitivity of the first demodulation stage 15 and the sensitivity of the third demodulation stage 20.

The second demodulation stage 19 is intended and arranged to demodulate the second modulated carrier signal CSM2. The second demodulation stage 19 is arranged to output a second demodulated carrier signal CS2 which is output, via an output 21, to a connection 22. The third demodulation stage 20 is intended and arranged to demodulate the third modulated carrier signal CSM3. The third demodulation stage 20 is arranged to output a third demodulated carrier signal CS3 which is output, via an output 23, to a third connection 24. The two demodulation stages 19 and 20 are also formed by amplitude demodulation stages.

The circuit 4 of the data carrier 1 shown in FIG. 1 is also provided with priority means 25. The priority means 25 are constructed in such a manner that they ensure that priority is always granted to only one demodulation stage 15, 19 or 20, that a demodulated carrier signal CS1, CS2 or CS3 reaches the signal processing means 18 only from this one demodulation stage 15, 19 or 20 and that, in the case of simultaneous demodulation of a modulated carrier signal CSM1 or CSM2 by means of at least two demodulation stages 15, 19 and 20 or 19 and 20, priority is always granted exclusively to the demodulation stage 15 or 19 having the lowest sensitivity so that the signal processing means 18 can be reached only by a demodulated carrier signal CS1 or CS2 from this one demodulation stage 15 or 19.

For each demodulation stage 15, 19, 20, the priority means 25 include a detection stage 26, 27, 28, respectively, which is arranged to detect the output of a demodulated carrier signal CS1, CS2 or CS3 by the relevant demodulation stage 15, 19 or 20, respectively. Each detection stage 26, 27 or 28 can output a detection signal DS1, DS2 or DS3, respectively, i.e. via a connection 29, 30 or 31, respectively. The three connections 29, 30 and 31 are connected to the control means 12 so that the detection signals DS1, DS2 and DS3 can be applied to the control means 12. In dependence on the detection signals DS1, DS2 and DS3 received, the control means 12 ensure that always only one demodulation stage 15, 19 or 20 is granted priority and that a demodulated carrier signal CS1, CS2 or CS3 can reach the signal processing means 18 only from this one demodulation stage 15, 19 or 20, and that in the case of simultaneous demodulation of a modulated carrier signal CSM1 or CSM2 by means of at least two demodulation stages 15, 19 and 20 or 19 and 20, the demodulation stage 15 or 19 having the each time lowest sensitivity is always granted priority and that a demodulated carrier signal CS1 or CS2 can reach the signal processing means 18 only from this one demodulation stage 15 or 19.

In order to realize the foregoing, the priority means 25 include signal forwarding stages 32, 33 and 34 which are connected in series with the demodulation stages 15, 19 and 20, i.e. succeed the demodulation stages 15, 19 and 20 in the present case; these forwarding stages can be deactivated and activated by means of control signals SS1, SS2 and SS3. The control means 12 are arranged to generate and output such control signals SS1, SS2 and SS3 for the deactivation and activation of the signal forwarding stages 32, 33 and 34. The control signals SS1, SS2 and SS3, which can be generated by means of the control means 12 in dependence on the detection signals DS1, DS2 and DS3, can be applied, via control connections 35, 36 and 37, to control inputs 38, 39 and 40 of the signal forwarding stages 32, 33 and 34. When the first control signal SS1 occurs on the first control connection 35, the first signal forwarding stage 32 is activated, i.e. driven to its conductive state, so that a first demodulated carrier signal CS1, present on the first connection 17, can be forwarded to the signal processing means 18. When the second control signal SS2 appears on the second control connection 36, the second signal forwarding stage 33 is activated, i.e. driven to its conductive state, so that in that case a second demodulated carrier signal CS2, present on the second connection 22, can be forwarded to the signal processing means 18. When the third control signal SS3 occurs on the third control connection 37, the third signal forwarding stage 34 is activated, i.e. driven to its conductive state, so that in that case a third demodulated carrier signal CS3, present on the connection 24, can be forwarded to the signal processing means 18.

The three signal forwarding stages 32, 33 and 34 may be formed by separate stages. In practice, however, it is advantageous to realize the three signal forwarding stages 32, 33 and 34 by means of a multiplexer 50 as is diagrammatically indicated by way of dash-dot lines in FIG. 1.

By means of the priority means 25, a priority can be granted or assigned to one demodulation stage 15, 19 or 20 by the driving of one of the three signal forwarding stages 32, 33 and 34. The priority means 25 are constructed in such a manner that, after having granted priority to one demodulation stage 15, 19 or 20, the priority means 25 sustain the granted priority for a given period. In reality this is achieved in that the control means 12 keep a signal forwarding stage 32, 33 or 34 in its conductive state for the given priority period after having adjusted the relevant signal forwarding stage 32, 33 or 34 to its conductive state. The priority period may be, for example the duration of a command sequence or the period of time until the next power-on-reset, i.e. until the occurrence of a next reset signal RS.

The operation of the data carrier 1, or the circuit 4 of the data carrier 1, will be described briefly hereinafter.

When a third amplitude modulated carrier signal CSM3, having been modulated in respect of amplitude with a modulation percentage or modulation intensity of 10%, is applied to the data carrier 1, or the circuit 4, this third amplitude modulated carrier signal CSM3 is demodulated exclusively by the third demodulation stage 20, because this third demodulation stage 20 has the highest sensitivity and, because of its high sensitivity, it responds to the third carrier signal CSM3 which is only 10% amplitude modulated. In this case only the third demodulation stage 20 outputs a demodulated carrier signal via its output 23, i.e. the third demodulated carrier signal CS3. This output is detected by means of the third detection stage 28, with the result that the third detection stage 28 applies the third detection signal DS3, via the connection 31, to the control means 12. As a result, the control means 12 apply, via the third control connection 37, the third control signal SS3 to the third signal forwarding stage 34, so that the third signal forwarding stage 34 is activated, i.e. driven to its conductive state, with the result that the third demodulated carrier signal CS3 is forwarded to the signal processing means 18. No control signals SS1 and SS2 are applied to the first signal forwarding stage 32 and the second-signal forwarding stage 33, so that the two signal forwarding stages 32 and 33 are not activated but remain deactivated. Priority is thus assigned or granted to the third demodulation stage 20 by the priority means 25.

When a second amplitude modulated carrier signal CSM2, having been modulated in respect of amplitude with a modulation percentage or modulation intensity of 50%, is applied to the data carrier 1, or the circuit 4, not only the third demodulation stage 20 will be activated by this second amplitude modulated carrier signal CSM2, but also the second demodulation stage 19; this is because the second demodulation stage 19 has a sensitivity adapted to the modulation intensity of 50% and the sensitivity of the demodulation stage 20 is higher than that of the second modulation stage 19, so that the third modulation stage 20 is also activated. As a result, the two demodulation stages 19 and 20 simultaneously demodulate the second modulated carrier signal CSM2, so that a respective demodulated carrier signal occurs on the outputs 21 and 23 of the two demodulation stages 19 and 20, i.e. the second demodulated carrier signal CS2 on the output 21 of the second demodulation stage 19 and the third demodulated carrier signal CS3 on the output 23 of the third demodulation stage 20.

The occurrence of the two demodulated carrier signals CS2 and CS3 is detected by means of the two detection stages 27 and 28, with the result that the two detection stages 27 and 28 output the two detection signals DS2 and DS3 which are applied, via the connections 30 and 31, to the control means 12. The control means 12 process the two detection signals DS2 and DS3 in such a manner that they subsequently output the second control signal SS2, via the second control connection 36, to the second signal forwarding means 33. As a result, only the second signal forwarding means 33 are activated, i.e. driven to their conductive state, so that only the second demodulated carrier signal CS2, present on the second connection 22, is forwarded to the signal processing means 18. Because of the fact that in the described case the control means 12 do not output a third control signal SS3 to the third signal forwarding stage 34, the third signal forwarding stage 34 remains in its deactivated, i.e. non-conductive, state so that forwarding of the third demodulated carrier signal CS3 to the signal processing means 18 is precluded. The first signal forwarding stage 32 also remains deactivated. The priority means 25 have thus assigned or granted priority to the second demodulation stage 19 in this case.

When a first modulated carrier signal CSM1, having been modulated in respect of amplitude with a modulation intensity or a modulation percentage of 100%, is applied to the data carrier 1, or to the circuit 4, all three demodulation stages 15, 19 and 20 are activated, so that all three demodulation stages 15, 19 and 20 output a demodulated carrier signal via their outputs 16, 21 and 23, i.e. the first demodulated carrier signal CS1, the second demodulated carrier signal CS2, and the third demodulated carrier signal CS3.

The appearance of all three demodulated carrier signals CS1, CS2 and CS3 is detected by means of the three detection-stages 26, 27 and 28, with the result that the detection stages 26, 27 and 28 output their detection signals DS1, DS2 and DS3, via the connections 29, 30 and 31, to the control means 12. The control means 12 subsequently process the received detection signals DS1, DS2 and DS3 in such a manner that they generate only the first control signal SS1 which is applied, via the first control connection 35, to the first signal forwarding stage 32; no second control signal CS2 and no third control signal CS3 is generated, so that such signals are not applied to the second signal forwarding stage 33 and the third signal forwarding stage 34. Consequently, only the first signal forwarding stage 32 is driven to its conductive state, so that only the first demodulated carrier signal CS1, occurring on the first connection 17, is forwarded to the signal processing means 18. The priority means 25 thus grant a priority to the first demodulation stage 15 which in this case has the lowest sensitivity.

Figure 2:
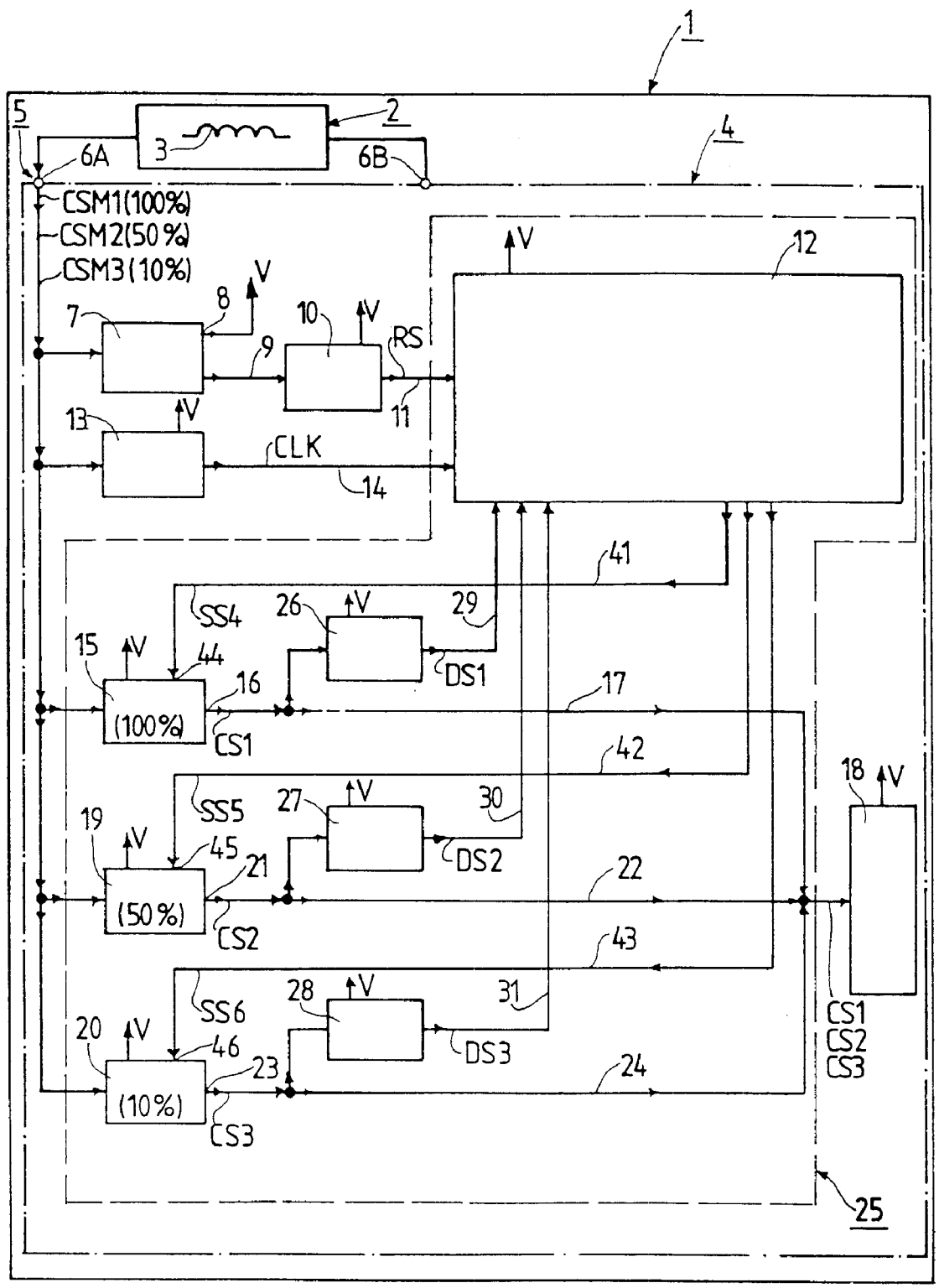
FIG. 2 shows a block diagram of an in this context essential part of a data carrier and a circuit for such a data carrier in a second embodiment.

FIG. 2 shows a second embodiment of a data carrier 1 according to the invention; this data carrier deviates from the data carrier 1 shown in FIG. 1 essentially in that the priority means 25 include the three demodulation stages 15, 19 and 20 and in that the demodulation stages 15, 19 and 20 are arranged so as to be deactivatable or activatable by means of control signals SS4, SS5 and SS6, and that the control means 12 are arranged to generate and output such control signals SS4, SS5 and SS6 in order to deactivate or activate the demodulation stages 15, 19 and 20. Between the control means 12 and the three controllable demodulation stages 15, 19 and 20 there are now provided three control connections 41, 42 and 43, the first control connection 41 thereof extends to a control input 44 of the first demodulation stage 15 whereas the second control connection 42 extends to a control input 45 of the second demodulation stage 19 and the third control connection 43 extends to a control input 46 of the third demodulation stage 20.

The three demodulation stages 15, 19 and 20 in the data carrier 1 shown in FIG. 2 are controlled in the same way as the three signal forwarding stages 32, 33 and 34.

When the data carrier 1, or the circuit 4, receives a third amplitude modulated carrier signal CSM3, in which case only the third demodulation stage 20 is activated, the third control signal SS6 is applied only to the third demodulation stage 20, so that the third demodulation stage 20 is activated whereas the other two demodulation stages 15 and 19 do not receive a control signal SS4 or SS5, so that these two demodulation stages 15 and 19 remain deactivated.

When the data carrier 1, or the circuit 4, receives a second amplitude modulated carrier signal CSM2, in which case the second demodulation stage 19 and the third demodulation stage 20 are activated, the control means 12 apply the second control signal SS5 only to the second demodulation stage 19, so that only the second demodulation stage 19 is activated whereas the other two demodulation stages 15 and 20 are deactivated.

When the data carrier 1 or the circuit 4, receives a first amplitude modulated carrier signal CSM1, in which case all three demodulation stages 15, 19 and 20 are activated, only the first demodulation stage 15 receives the first control signal SS4 from the control means 12, so that only the first demodulation stage 15 is activated whereas the other two demodulation stages 19 and 20 are deactivated.

Priority can thus be granted to each of the demodulation stages 15, 19 and 20 of the data carrier of FIG. 2 by controlled activation or deactivation of the demodulation stages 15, 19 and 20.

In the described data carriers it is advantageous that carrier signals CSM1, CSM2 and CSM3, amplitude modulated with different modulation intensities, can be received and demodulated, it always being ensured that a demodulated carrier signal CS1, CS2 or CS3 can be output to signal processing means 18 only by the demodulation stage 15, 19 or 20 which is best suitable for a received amplitude modulated carrier signal CSM1, CSM2 or CSM3, so that it always ensured that only a perfect and high-quality demodulated carrier signal CS1, CS2 or CS3 is always applied to the signal processing means 18 for processing the demodulated carrier signals CS1, CS2 and CS3.

Both described embodiments of data carriers concern data carriers in which carrier signals subjected to amplitude modulation are received and amplitude demodulated by means of amplitude demodulation stages 15, 19 and 20. It is to be noted explicitly that the steps according to the invention are not restricted to data carriers which are arranged to receive and demodulate and forward amplitude modulated carrier signals. The steps according to the invention can likewise be implemented for data carriers which are arranged to receive at least two frequency modulated or phase modulated carrier signals, said data carriers then including at least two frequency demodulation stages or at least two phase demodulation stages whereto a respective priority can be granted by means of priority means. If necessary, a data carrier according to the invention may also be provided with more than three demodulation stages.

As regards the data carrier 1 described with reference to FIG. 1 it is also to be noted that the signal forwarding stages 32, 33 and 34, connected in series with the three demodulation stages 15, 19 and 20 in this data carrier 1, can also be connected so as to precede the demodulation stages 15, 19 and 20 in the signal path. It is also to be noted that such a data carrier 1 can also be effectively used without using the first signal forwarding stage 32. Furthermore, it is to be noted that such a data carrier 1 may also be provided with only two demodulation stages, for example the two demodulation stages 15 and 20.

Regarding the data carrier 1 described with reference to FIG. 2 it is to be noted that the first demodulation stage 15 in this data carrier 1 may also be constructed so as to be non-deactivatable or non-activatable. This data carrier 1 can also be effectively used while utilizing only two demodulation stages, for example the two demodulation stages 15 and 20.

What is claimed is:

1. A data carrier, which includes receiver means for receiving a carrier signal modulated in respect of a signal parameter and with a given modulation intensity, and includes an integrated circuit which includes connection means which are connected to the receiver means, a demodulation stage which is connected to the connection means, is arranged to demodulate the modulated carrier signal and to output a demodulated carrier signal, and has a sensitivity adapted to the given modulation intensity used for the modulated carrier signal, and includes signal processing means which succeed the demodulation stage and are arranged to process the demodulated carrier signal, characterized in that the data carrier is arranged to receive at least one additional carrier signal which is modulated in respect of the same signal parameter but with an other, given modulation intensity, the circuit including at least one additional demodulation stage which is also connected to the connection means and has an other sensitivity which is adapted to the other, given modulation intensity used for the additional modulated carrier signal, there being provided priority means which ensure that priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the demodulation stage having the each time lowest sensitivity, and that a demodulated carrier signal reaches the signal processing means only from this one demodulation stage.

2. A data carrier as claimed in claim 1, characterized in that for each demodulation stage, the priority means include a detection stage for detecting the output of a demodulated carrier signal by the relevant demodulation stage, that each detection stage can output a detection signal, that there are provided control means which can be supplied with the detection signals and ensure that, in dependence on the detection signals, priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the demodulation stage having the each time lowest sensitivity, and that a demodulated carrier signal reaches the signal processing means only from this one demodulation stage.

3. A data carrier as claimed in claim 2, characterized in that the priority means include the demodulation stages, that the demodulation stages are arranged so as to be deactivatable and activatable by means of control signals, and that the control means are arranged to generate and output control signals for deactivating and activating the demodulation stages.

4. A data carrier as claimed in claim 2, characterized in that the priority means include signal forwarding stages which are connected in series with the demodulation stages, that the signal forwarding stages are arranged so as to be deactivatable and activatable by means of control signals, and that the control means are arranged to generate and output control signals for deactivating and activating the signal forwarding stages.

5. A data carrier as claimed in claim 1, characterized in that the priority means are arranged, after having granted priority to a demodulation stage, to sustain the granted priority for a given priority period.

6. An integrated circuit for a data carrier, which circuit includes connection means for receiving a carrier signal modulated in respect of a signal parameter and with a given modulation intensity, includes a demodulation stage which is connected to the connection means, is arranged to demodulate the modulated carrier signal and to output a demodulated carrier signal, and has a sensitivity adapted to the given modulation intensity used for the modulated carrier signal, and includes signal processing means which succeed the demodulation stage and are arranged to process the demodulated carrier signal characterized in that the data carrier is arranged to receive at least one additional carrier signal which is modulated in respect of the same signal parameter, but with an other, given modulation intensity, the circuit including at least one additional demodulation stage which is also connected to the connection means and has an other sensitivity which is adapted to the other, given modulation intensity used for the additional modulated carrier signal, there being provided priority means which ensure that priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the modulation stage having the each time lowest sensitivity, and that a demodulated carrier signal reaches the signal processing means only from this one demodulation stage.

7. An integrated circuit as claimed in claim 6, characterized in that for each demodulation stage the priority means include a detection stage for detecting the output of a demodulated carrier signal by the relevant demodulation stage, that each detection stage can output a detection signal, that there are provided control means which can be supplied with the detection signals and ensure that, in dependence on the detection signals, priority is granted each time to one demodulation stage only, that a demodulated carrier signal reaches the signal processing means only from this one demodulation stage and that, in the case of simultaneous demodulation of a modulated carrier signal by means of at least two demodulation stages, priority is granted each time to the demodulation stage having the each time lowest sensitivity, and that a demodulated carrier signal reaches the signal processing means only from this one demodulation stage.

8. An integrated circuit as claimed in claim 7, characterized in that the priority means include the demodulation stages, that the demodulation stages are arranged so as to be deactivatable and activatable by means of control signals, and that the control means are arranged to generate and output control signals for deactivating and activating the demodulation stages.

9. An integrated circuit as claimed in claim 7, characterized in that the priority means include signal forwarding stages which are connected in series with the demodulation stages that the signal forwarding stages are arranged so as to be deactivatable and activatable by means of control signals, and that the control means are arranged to generate and output control signals for deactivating and activating the signal forwarding stages.

10. An integrated circuit as claimed in claim 6, characterized in that the priority means are arranged, after having granted priority to a demodulation stage, to sustain the granted priority for a given priority period.

* * * * *